United States Patent
Fukumoto

[11] Patent Number: 5,838,501
[45] Date of Patent: Nov. 17, 1998

[54] INDIRECT OPHTHALMOSCOPY LENS

[75] Inventor: Satoshi Fukumoto, Machida, Japan

[73] Assignee: Nikon Corporation, Tokyo, Japan

[21] Appl. No.: 846,253

[22] Filed: Apr. 30, 1997

Related U.S. Application Data

[63] Continuation of Ser. No. 506,568, Jul. 25, 1995, abandoned.

[30]    Foreign Application Priority Data

Jul. 29, 1994   [JP]   Japan ..................... 6-197235

[51] Int. Cl.⁶ ................ G02B 3/02; A61B 3/10
[52] U.S. Cl. .......................... 359/718; 351/205
[58] Field of Search .................... 359/708, 718; 351/216, 218, 159, 205

[56]              References Cited

U.S. PATENT DOCUMENTS 4,469,413   9/1984   Shirayanagi ........................ 359/718

FOREIGN PATENT DOCUMENTS 62-11325   3/1987   Japan .

*Primary Examiner*—Georgia Y. Epps
*Assistant Examiner*—Jordan M. Schwartz
*Attorney, Agent, or Firm*—Shapiro and Shapiro

[57]              ABSTRACT

An indirect ophthalmoscopy lens is comprised of a single biconvex lens and is arranged so that at least one of a patient-side surface and an examiner-side surface of the biconvex lens is formed as an aspherical surface and the following conditions are satisfied:

$$65 < vd$$

$$nd < 1.67$$

where nd and vd are an index of refraction and an Abbe number, respectively, of the biconvex lens for the d-line.

7 Claims, 6 Drawing Sheets

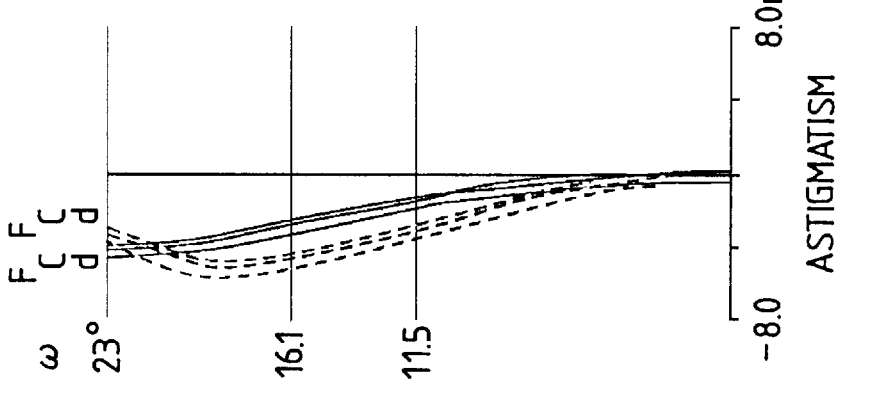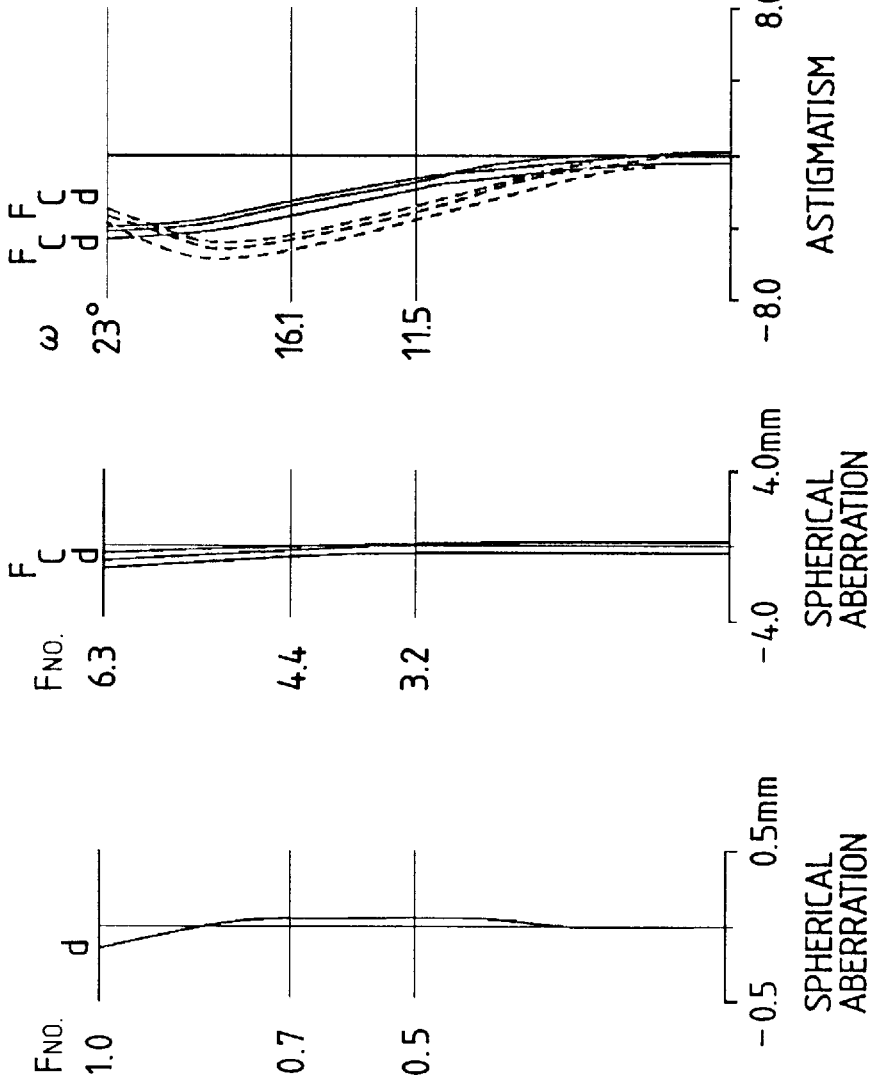

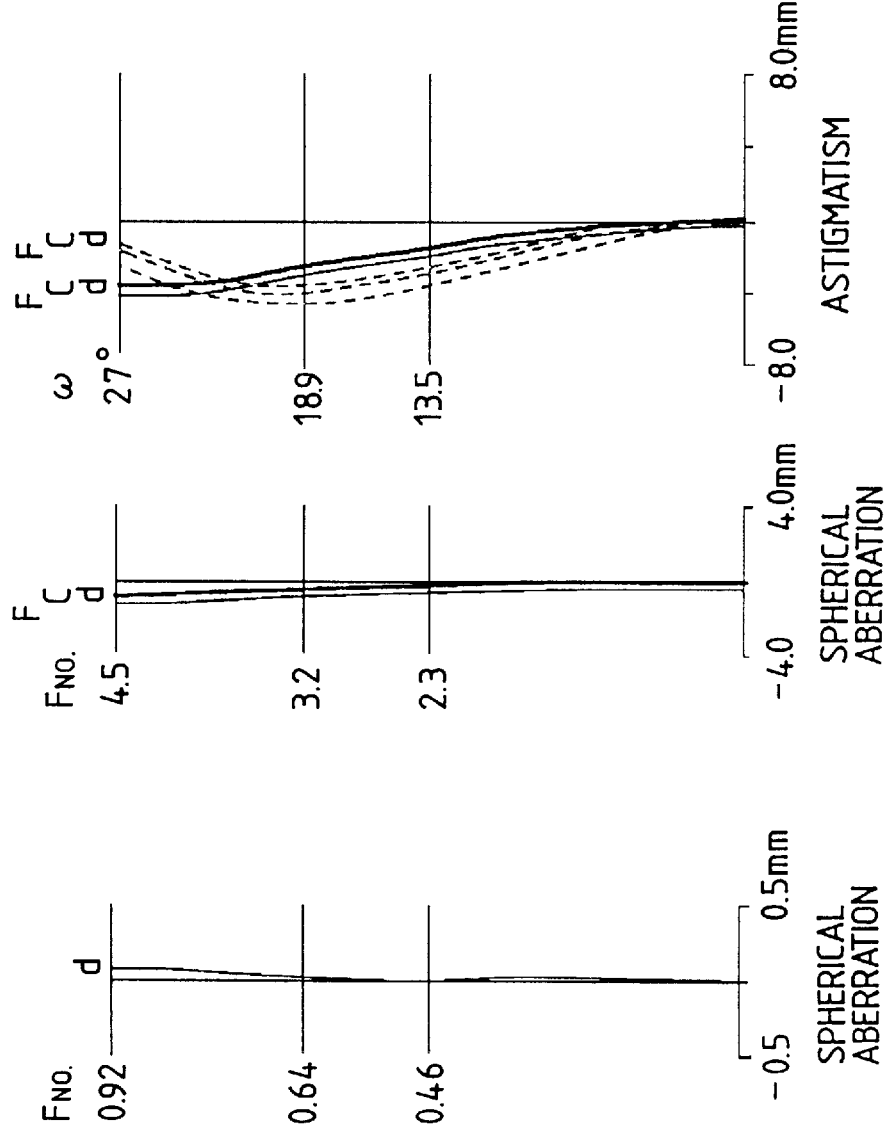

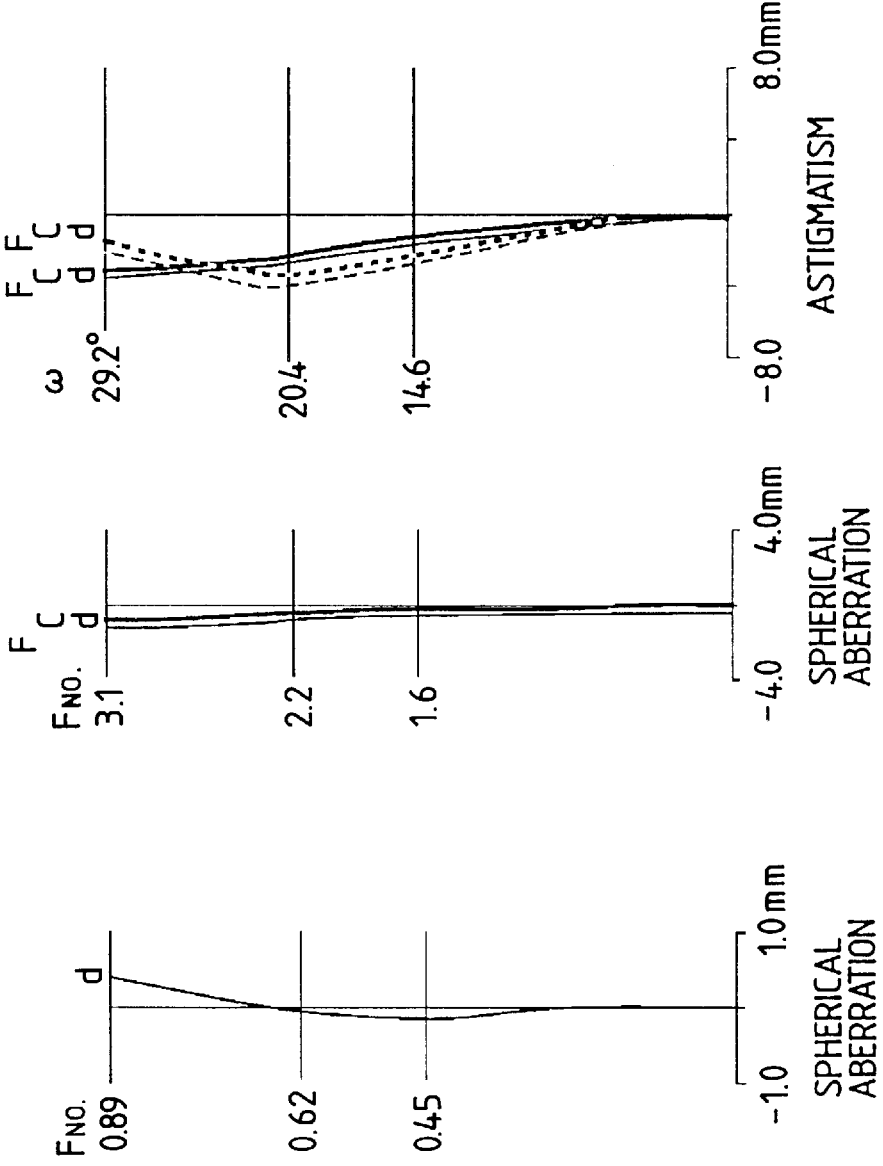

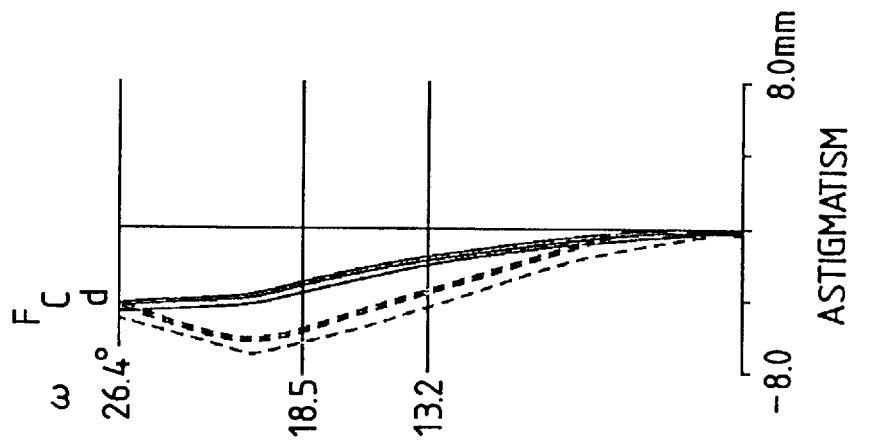
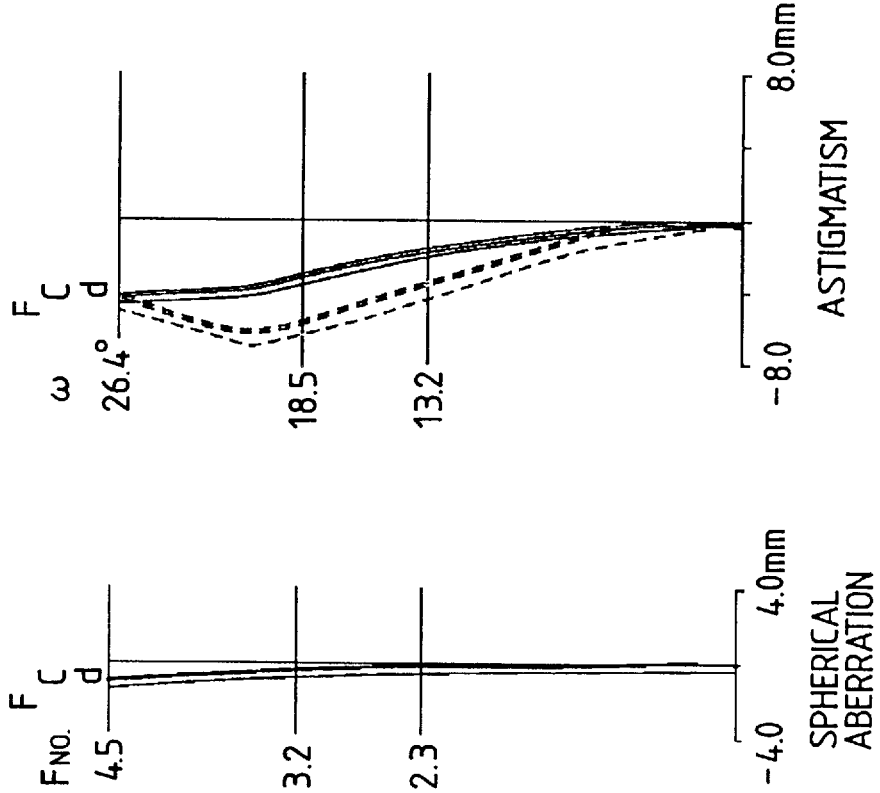
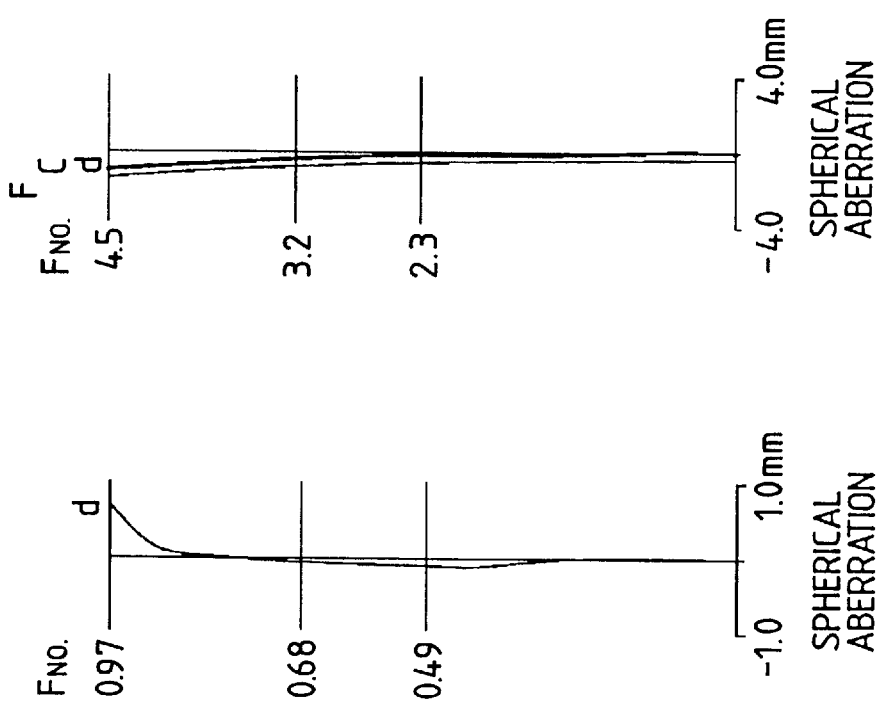

INDIRECT OPHTHALMOSCOPY LENS

This is a continuation of application Ser. No. 08/506,568 filed Jul. 25, 1995, now abandoned.

BACKGROUND OF THE INVENTION

1. Field of the Invention

The present invention relates to an indirect ophthalmoscopy lens.

2. Related Background Art

FIG. 7 is a drawing to illustrate a function of an indirect ophthalmoscopy lens in an illumination optical system. As shown in FIG. 7, the indirect ophthalmoscopy lens 1 functions as a condenser lens to condense a light beam from an illumination light source 2 near the pupil of a patient's eye 3 and then to illuminate the fundus oculi.

Also, FIG. 8 is a drawing to illustrate a function of the indirect ophthalmoscopy lens in an observation optical system. As shown in FIG. 8, the indirect ophthalmoscopy lens 1 images a retina portion of the fundus oculi of an illuminated patient's eye 3, as a fundus oculi image 4 in the space. Then an examiner 5 observes the spatial fundus oculi image 4. Thus, the indirect ophthalmoscopy lens 1 functions as an imaging lens in the observation optical system.

For observing the fundus oculi, there are methods of monocular observation and stereoscopic observation with binocular apparatus. For inspecting the anterior segment of an eye, the indirect ophthalmoscopy lens is used also as a loupe.

In order to comfortably observe the patient's eye, spherical aberration, coma, etc. should be sufficiently corrected in a conjugate relation between the pupil of the patient's eye and the pupil of the examiner's eye, and curvature of field, astigmatism, etc. of the fundus oculi image of the patient's eye, formed in the space, should be sufficiently corrected as well.

It was, however, difficult to correct the indirect ophthalmoscopy lens for the above-described aberrations because it is a single lens, and there was also such an inconvenience that correction for chromatic aberration was very difficult.

SUMMARY OF THE INVENTION

The present invention has been accomplished taking account of the above-described problems, and an object of the present invention is to provide an indirect ophthalmoscopy lens well corrected for the various aberrations, which were difficult to correct in conventional indirect ophthalmoscopy lenses, particularly well corrected for chromatic aberration, curvature of field, and astigmatism in the observation optical system.

To solve the above problems, the present invention provides an indirect ophthalmoscopy lens which is comprised of a single biconvex lens, wherein at least one of a patient-side surface and an examiner-side surface of the biconvex lens is formed as an aspherical surface and wherein the following conditions are satisfied:

$$65 < \nu d$$

$$nd < 1.67$$

where nd and νd are an index of refraction and an Abbe number, respectively, of the biconvex lens for the d-line.

In a preferred embodiment of the present invention, the examiner-side surface is formed as an aspherical surface, and the following conditions are satisfied in the range of $0 < y < 0.8 \times |R2|$, $$-0.85 \leq R2/f \leq -0.4$$

$$-3.2 \leq (dx/dy) \cdot f/y \leq -0.5$$

where R2 is a radius of curvature of a paraxial surface in the aspherical surface, f is a focal length of the biconvex lens, y is an amount of displacement in the direction perpendicular to the optical axis with the origin at the vertex of the aspherical surface, and x is an amount of displacement in the direction of the optical axis.

The indirect ophthalmoscopy lens of the present invention is comprised of a single biconvex lens, at least one of the patient-side surface (hereinafter referred to as "first surface") and the examiner-side surface (hereinafter referred to as "second surface") of the biconvex lens is formed as an aspherical surface, and the following conditions of Equations (1) and (2) are satisfied:

$$65 < \nu d \tag{1}$$

$$nd < 1.67 \tag{2}$$

where

νd: an Abbe number of the biconvex lens for the d-line (λ=587.6 nm); and nd: an index of refraction of the biconvex lens for the d-line (λ=587.6 nm).

The conditions of Equations (1) and (2) concern the Abbe number and the index of refraction, respectively, of an optic material used for the indirect ophthalmoscopy lens.

The larger the Abbe number means, the smaller the dispersion as a change of the refractive index depending upon the wavelengths of the optic material. Therefore, use of an optic material with a large Abbe number can reduce the dispersing effect of light, whereby longitudinal chromatic aberration and lateral chromatic aberration can be reduced in the observation optical system.

However, optic materials generally have such a property that the refractive index becomes smaller as the Abbe number increases. Supposing indirect ophthalmoscopy lenses with a same focal length as biconvex lenses with the first surface and second surface both being spherical surfaces are made of optic materials with different refractive indices, an indirect ophthalmoscopy lens of an optic material with a smaller refractive index must be constructed to have smaller radii of curvatures of the two surfaces in order to be provided with a same power (refractive power).

The aberrations are likely to become degraded as the radius of curvature decreases. Further, a smaller radius of curvature means a smaller outer diameter of the indirect ophthalmoscopy lens, which narrows the field.

For the above reasons, the present invention employs the condition of Equation (1) to define the lower limit of the Abbe number and the condition of Equation (2) to define the upper limit of the refractive index in order to balance correction of chromatic aberration with the other aberrations.

Further, it is preferred in the present invention that the second surface be formed as an aspherical surface and that the following conditions of Equations (3) and (4) be satisfied:

$$-0.85 \leq R2/f \leq -0.4 \tag{3}$$

$$-3.2 \leq (dx/dy) \cdot f/y \leq -0.5 \tag{4}$$

where

R2: a radius of curvature of a paraxial surface in the aspherical surface; and f: a focal length, provided that $0 < y < 0.8 \times |R2|$ in the condition of Equation (4).

As shown in FIG. 1, letting the origin be at the vertex of the aspherical surface, x is an amount of displacement in the direction of the optical axis, and y is an amount of displacement in the direction perpendicular to the optical axis. Accordingly, the first order differential coefficient (dx/dy) represents a gradient of a tangent line at each point on the aspherical surface with respect to the y-axis.

The above description of the aberrations of biconvex spherical lenses can be similarly applied to biconvex lenses with the second surface being aspherical. In the present invention, however, when the conditions of Equations (3) and (4) are satisfied, better imaging performance can be achieved.

The condition of Equation (3) defines an appropriate range of a ratio between the focal length f of the indirect ophthalmoscopy lens according to the present invention and the radius R2 of curvature of the paraxial surface in the second surface.

Above the upper limit of the condition of Equation (3), negative curvature of field increases. Further, a meridional image surface takes large negative values, which inconveniently gives rise to astigmatism.

In contrast, below the lower limit of the condition of Equation (3), positive curvature of field arises and the meridional image plane takes larger positive values to give rise to astigmatism, which is thus unpreferable.

The aberrations can be better corrected by setting the lower limit of the condition of Equation (3) to −0.72 and the upper limit to −0.45, and more preferably, by setting the lower limit to −0.7 and the upper limit to −0.5.

The condition of Equation (4) concerns a configuration of the aspherical surface of the second surface.

Above the upper limit of the condition of Equation (4), positive curvature of field arises and the meridional image surface takes larger positive values to give rise to astigmatism, which is thus unpreferable.

In contrast, below the lower limit of the condition of Equation (4), negative curvature of field arises and the meridional image surface takes larger negative values to give rise to astigmatism, which is thus unpreferable.

The aberrations can be better corrected by setting the lower limit of the condition of Equation (4) to −3 and the upper limit thereof to −0.6, and more preferably, by setting the lower limit to −2.5 and the upper limit to −0.8.

As described above, the arrangement to satisfy the above conditions of Equations (1) to (4) can well correct the illumination optical system for spherical aberration and the observation optical system for the aberrations, particularly curvature of field and astigmatism, and can also decrease longitudinal chromatic aberration and lateral chromatic aberration.

In FIG. 1, compared to the spherical configuration (which is extension (extrapolation) of a spherical surface in the paraxial region) shown by the dashed line, the aspherical configuration of the present invention decreases the curvature toward the periphery of the lens so as to decrease the chromatic aberration by prism deflection but increase the outer diameter and effective diameter of the lens, whereby a larger field can be secured as a result. Accordingly, the indirect ophthalmoscopy lens of the present invention can sufficiently and evenly illuminate the fundus oculi of the patient's eye and can permit the examiner to observe the fundus oculi image of the patient's eye well corrected for curvature of field, astigmatism, etc. with decreased longitudinal chromatic aberration and lateral chromatic aberration.

In the indirect ophthalmoscopy lens of the present invention, the refractive power of the lens is preferably between 10 diopters and 54 diopters.

BRIEF DESCRIPTION OF THE DRAWINGS

FIGS. 2A to 2C are diagrams of aberrations in Embodiment 1, wherein FIG. 2A shows spherical aberration in the illumination optical system and FIG. 2B and FIG. 2C show spherical aberration and astigmatism in the observation image surface;

FIG. 3A to 3C are diagrams of aberrations in Embodiment 2, wherein FIG. 3A shows spherical aberration in the illumination optical system and FIG. 3B and FIG. 3C show spherical aberration and astigmatism in the observation image surface;

FIGS. 4A to 4C are diagrams of aberrations in Embodiment 3, wherein FIG. 4A shows spherical aberration in the illumination optical system and FIG. 4B and FIG. 4C show spherical aberration and astigmatism in the observation image surface;

FIG. 5A to 5C are diagrams of aberrations in Embodiment 4, wherein FIG. 5A shows spherical aberration in the illumination optical system and FIG. 5B and FIG. 5C show spherical aberration and astigmatism in the observation image surface;

DETAILED DESCRIPTION OF THE PREFERRED EMBODIMENTS

Figure 1:
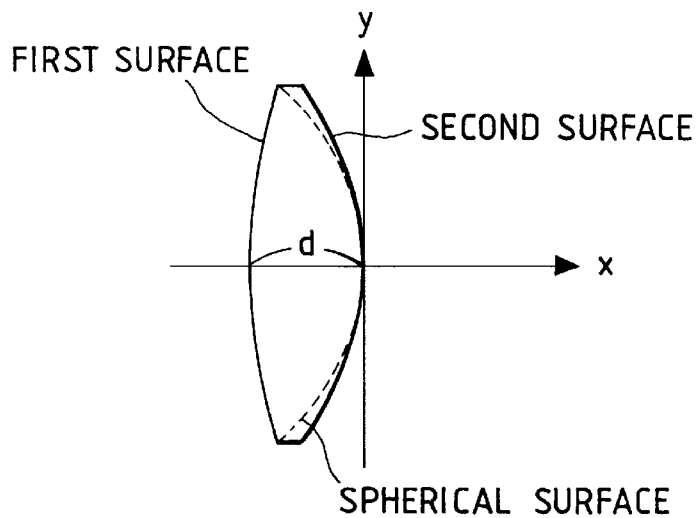
FIG. 1 is a drawing to show an aspherical configuration of an indirect ophthalmoscopy lens of the present invention and a coordinate system to define the configuration.

The preferred embodiments of the present invention will be described by reference to the accompanying drawings.

An aspherical surface is expressed by the following Equation (a) when a height in the direction perpendicular to the optical axis is y, an amount of displacement in the direction of the optical axis at height y is x, a radius of curvature as a reference, that is, a radius of curvature at the vertex of the aspherical surface is r, a conical coefficient is k, and an aspherical coefficient of the n-th order is Cn:

$$x=(y^2/r)/[1+(1-ky^2/r^2)^{1/2}]+C_2 y^2+C_4 y^4+C_6 y^6+C_8 y^8+C_{10} y^{10}+\ldots \quad (a)$$

A radius R of curvature of a paraxial surface in the aspherical surface is defined by the following Equation (b).

$$R=1/(2 \cdot C_2+1/r) \quad (b)$$

In each of the embodiments, the first surface is a spherical surface and the second surface is an aspherical surface.

The following Table 1 lists specifications of Embodiment 1 of the present invention. In Table 1, f represents a focal length, φ represents a refractive power, r1 represents a radius of curvature of the first surface, r2 represents a radius of curvature of the second surface at the vertex thereof, R2 represents a radius of curvature of a paraxial surface in the second surface, d represents a surface separation (thickness of lens center), and nd and vd represent a refractive index and an Abbe number, respectively, for the d-line (λ=587.6 nm).

The refractive power φ is expressed by 1000/f (mm) in diopters (dpt).

TABLE 1 f=50
φ=20 dpt
r1=84.27
d=15.2
Data For Aspherical Surface
r2=−33.2
k=0.3239
$C_2$=0.0000
$C_4$=0.2026×$10^{-5}$
$C_6$=0.1024×$10^{-8}$
$C_8$=0.2127×$10^{-12}$
$C_{10}$=−0.1835×$10^{-15}$
Values Corresponding to the Conditions
(1) νd=82.516
(2) nd=1.498
(3) R2/f=−0.664

FIGS. 2A to 2C are diagrams of aberrations in Embodiment 1, wherein FIG. 2A shows spherical aberration in the illumination optical system and FIG. 2B and FIG. 2C show spherical aberration and astigmatism in the observation image surface.

In the aberration diagrams, $F_{NO}$ represents F-number, ω represents field angle, d represents the d-line (λ=587.6 nm), F represents the F-line (λ=486.1 nm), and C represents the C-line (λ=656.3 nm).

In the aberration diagram showing astigmatism, the solid line represents the sagittal image surface and the dashed line represents the meridional image surface.

As seen from the aberration diagrams, the aberrations are well corrected in the present embodiment.

The following Table 2 lists specifications of Embodiment 2 of the present invention. In Table 2, f represents a focal length, φ represents a refractive power, r1 represents a radius of curvature of the first surface, r2 represents a radius of curvature of the second surface at the vertex thereof, R2 represents a radius of curvature of a paraxial surface in the second surface, d represents a surface separation (thickness of lens center), and nd and νd represent a refractive index and an Abbe number, respectively, for the d-line (λ=587.6 nm).

The refractive power φ is expressed by 1000/f (mm) in diopters (dpt).

TABLE 2 f=35.7
φ=28 dpt
r1=58.46
d=14.0
Data For Aspherical Surface
r2=−23.5
k=−0.1753
$C_2$=0.0000
$C_4$=0.1730×$10^{-6}$
$C_6$=0.5354×$10^{-8}$
$C_8$=0.4281×$10^{-11}$
$C_{10}$=−0.5985×$10^{-14}$
Values Corresponding to the Conditions
(1) νd=82.516
(2) nd=1.498
(3) R2/f=−0.658

FIGS. 3A to 3C are diagrams of aberrations in Embodiment 2, wherein FIG. 3A shows spherical aberration in the illumination optical system and FIG. 3B and FIG. 3C show spherical aberration and astigmatism in the observation image surface.

In the aberration diagrams, $F_{NO}$ represents F-number, ω represents field angle, d represents the d-line (λ=587.6 nm), F represents the F-line (λ=486.1 nm), and C represents the C-line (λ=656.3 nm).

In the aberration diagram showing astigmatism, the solid line represents the sagittal image surface and the dashed line represents the meridional image surface.

As seen from the aberration diagrams, the aberrations are well corrected in the present embodiment.

The following Table 3 lists specifications of Embodiment 3 of the present invention. In Table 3, f represents a focal length, φ represents a refractive power, r1 represents a radius of curvature of the first surface, r2 represents a radius of curvature of the second surface at the vertex thereof, R2 represents a radius of curvature of a paraxial surface in the second surface, d represents a surface separation (thickness of lens center), and nd and νd represent a refractive index and an Abbe number, respectively, for the d-line (λ=587.6 nm).

The refractive power φ is expressed by 1000/f (mm) in diopters (dpt).

TABLE 3 f=25
φ=40 dpt
r1=40.48
d=12.0
Data For Aspherical Surface
r2=−16.2
k=0.2476
$C_2$=0.0000
$C_4$=0.1002×$10^{-4}$
$C_6$=0.3346×$10^{-7}$
$C_8$=0.8496×$10^{-10}$
$C_{10}$=−0.1759×$10^{-12}$
Values Corresponding to the Conditions
(1) νd=82.516
(2) nd=1.498
(3) R2/f=−0.648

FIGS. 4A to 4C are diagrams of aberrations in Embodiment 3, wherein FIG. 4A shows spherical aberration in the illumination optical system and FIG. 4B and FIG. 4C show spherical aberration and astigmatism in the observation image surface.

In the aberration diagrams, $F_{NO}$ represents F-number, ω represents field angle, d represents the d-line (λ=587.6 nm), F represents the F-line (λ=486.1 nm), and C represents the C-line (λ=656.3 nm).

In the aberration diagram showing astigmatism, the solid line represents the sagittal image surface and the dashed line represents the meridional image surface.

As seen from the aberration diagrams, the aberrations are well corrected in the present embodiment.

The following Table 4 lists specifications of Embodiment 4 of the present invention. In Table 4, f represents a focal length, φ represents a refractive power, r1 represents a radius of curvature of the first surface, r2 represents a radius of curvature of the second surface at the vertex thereof, R2 represents a radius of curvature of a paraxial surface in the second surface, d represents a surface separation (thickness of lens center), and nd and νd represents a refractive index and an Abbe number, respectively, for the d-line (λ=587.6 nm).

The refractive power φ is expressed by 1000/f (mm) in diopters (dpt).

TABLE 4 f=35.7
φ=28 dpt
r1=54.12
d=14.0
Data For Aspherical Surface
r2=−20.0
k=0.07619
$C_2=0.0000$
$C_4=0.18154\times10^{-5}$
$C_6=0.65216\times10^{-8}$
$C_8=0.10021\times10^{-10}$
$C_{10}=-0.10281\times10^{-13}$
Values Corresponding to the Conditions
(1) vd=95.247
(2) nd=1.434
(3) R2/f=−0.56

FIGS. 5A to 5C are diagrams of aberrations in Embodiment 4, wherein FIG. 5A shows spherical aberration in the illumination optical system and FIG. 5B and FIG. 5C show spherical aberration and astigmatism in the observation image surface.

In the aberration diagram, $F_{NO}$ represents F-number, ω represents field angle, d represents the d-line (λ=587.6 nm), F represents the F-line (λ=486.1 nm), and C represents the C-line (λ=656.3 nm).

In the aberration diagrams showing astigmatism, the solid line represents the sagittal image surface and the dashed line represents the meridional image surface.

As seen from the aberration diagrams, the aberrations are well corrected in the present embodiment.

Figure 6:
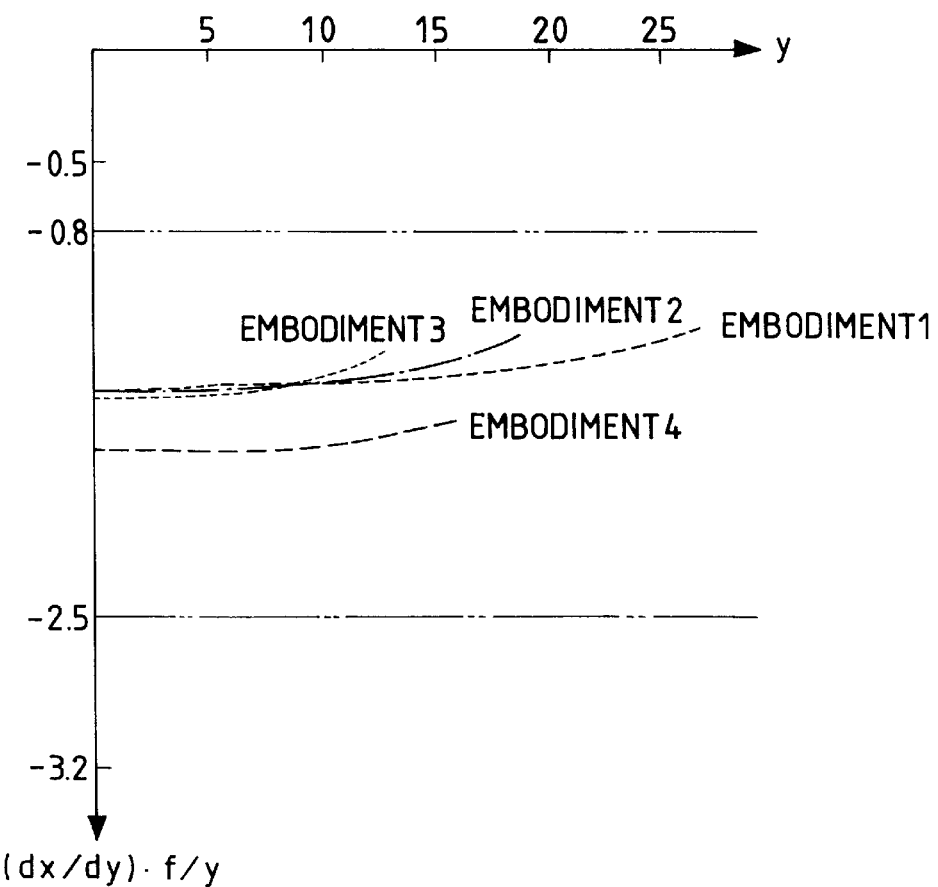
FIG. 6 is a drawing to show ranges of values for the condition of Equation (4) in the respective embodiments.
Figure 7:
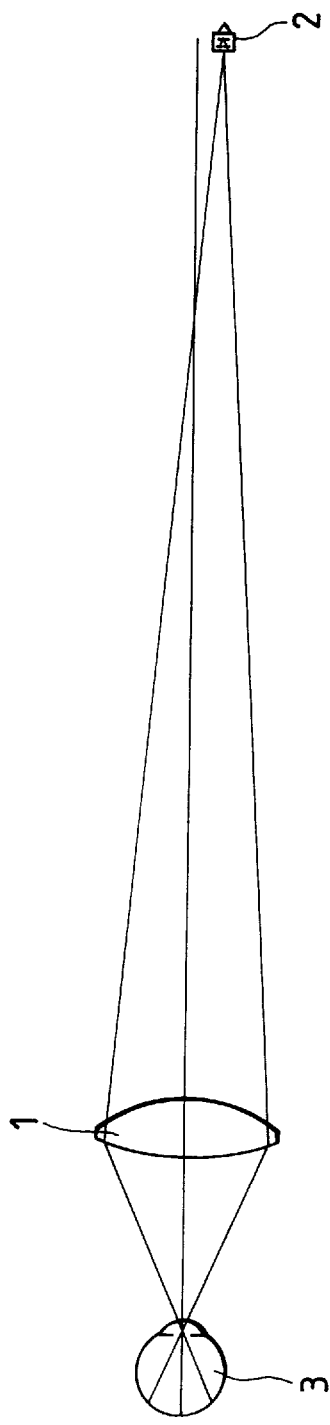
FIG. 7 is a drawing to illustrate the function of the indirect ophthalmoscopy lens in the illumination optical system.
Figure 8:
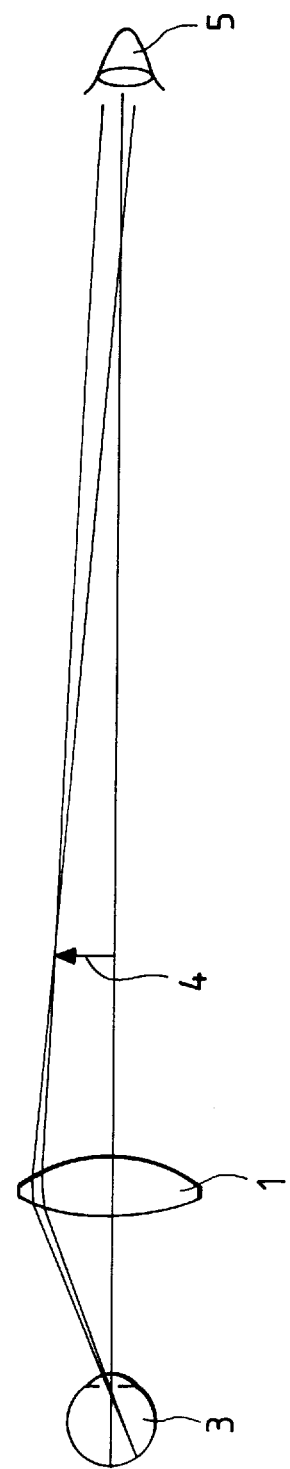
FIG. 8 is a drawing to illustrate the function of the indirect ophthalmoscopy lens in the observation optical system.

FIG. 6 is a drawing to show ranges of values for the condition of Equation (4) in the respective embodiments.

In FIG. 6, the horizontal axis indicates displacement amounts y in the direction perpendicular to the optical axis with the origin at the vertex of the aspherical surface, and the vertical axis values for the condition of Equation (4), i.e., values of (dx/dy)·f/y.

In the drawing, −0.5 and −3.2 on the vertical axis represent the upper limit and the lower limit of the condition of Equation (4), and the chain double-dashed line for −0.8 and the chain double-dashed line for −2.5 on the vertical axis represent a more preferable upper limit and lower limit.

As shown in FIG. 6, the values for the condition of Equation (4) in the above-described embodiments are within the range defined by the upper limit and the lower limit.

Each of the above-described embodiments is so arranged that the first surface is a spherical surface and the second surface is an aspherical surface, but it is apparent that the aberrations can be better corrected if both surfaces are aspherical.

As described above, the present invention can realize the indirect ophthalmoscopy lens well corrected for the aberrations, which were not sufficiently corrected in the conventional indirect ophthalmoscopy lenses, particularly well corrected for chromatic aberration, curvature of field, and astigmatism in the observation optical system.

What is claimed is:

1. An indirect ophthalmoscopy lens, comprising:
   a single biconvex lens, wherein an examiner-side surface of said biconvex lens is aspherical and the following conditions are satisfied:

65<vd nd<1.67 where
      nd: an index of refraction of said biconvex lens for the d-line; and
      vd: an Abbe number of said biconvex lens for the d-line,
      and further wherein the following conditions are satisfied in a range of 0<y<0.8×|R2|:

$-0.70 \leq R2/f \leq -0.5$ $-2.5 \leq (dx/dy)\cdot f/y \leq -0.8$ where R2 is a radius of curvature of a paraxial region of said aspherical surface, f is a focal length of said biconvex lens, y is an amount of displacement in a direction perpendicular to an optical axis with the origin at the vertex of said aspherical surface, and x is an amount of displacement in a direction of the optical axis of said aspherical surface with the origin at the vertex of said aspherical surface.

2. The indirect ophthalmoscopy lens according to claim 1, wherein a patient-side surface of said biconvex lens is spherical.

3. The indirect ophthalmoscopy lens according to claim 2, wherein a refractive power of said biconvex lens is between 10 diopters and 54 diopters.

4. An indirect ophthalmoscopy lens, comprising:
   a single biconvex lens, wherein an examiner-side surface of said biconvex lens is aspherical and the following conditions are satisfied:

65<vd nd<1.67 where
      nd: an index of refraction of said biconvex lens for the d-line; and
      vd: an Abbe number of said biconvex lens for the d-line,
      and further wherein the following conditions are satisfied in a range of 0<y<0.8×|R2|:

$-0.70 \leq R2/f \leq -0.5$ $-3.2 \leq (dx/dy)\cdot f/y \leq -0.5$ where R2 is a radius of curvature of a paraxial region of said aspherical surface, f is a focal length of said biconvex lens, v is an amount of displacement in a direction perpendicular to an optical axis with the origin at the vertex of said aspherical surface, and x is an amount of displacement in a direction of the optical axis of said aspherical surface with the origin at the vertex of said aspherical surface.

5. The indirect ophthalmoscopy lens according to claim 4, wherein a patient-side surface of said biconvex lens is spherical.

6. The indirect ophthalmoscopy lens according to claim 4, wherein a refractive power of said biconvex lens is between 10 diopters and 54 diopters.

7. The indirect ophthalmoscopy lens according to claim 4, wherein the following condition is satisfied in the range of 0<y<0.8×|R2|:

$-3 \leq (dx/dy)\cdot f/y \leq -0.6$

* * * * *